(12) United States Patent
Tran et al.

(10) Patent No.: US 10,248,620 B2
(45) Date of Patent: Apr. 2, 2019

(54) DATABASE TABLE COLUMN ANNOTATION

(71) Applicant: HEWLETT PACKARD ENTERPRISE DEVELOPMENT LP, Houston, TX (US)

(72) Inventors: Hoa Binh Nga Tran, Andover, MA (US); Lakshmikant Shrinivas, Lexington, MA (US); Kanti Marita Mann, Cambridge, MA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 719 days.

(21) Appl. No.: 14/785,744

(22) PCT Filed: Apr. 30, 2013

(86) PCT No.: PCT/US2013/038842
§ 371 (c)(1),
(2) Date: Oct. 20, 2015

(87) PCT Pub. No.: WO2014/178843
PCT Pub. Date: Nov. 6, 2014

(65) Prior Publication Data
US 2016/0078070 A1   Mar. 17, 2016

(51) Int. Cl.
*G06F 16/22* (2019.01)
*G06F 16/21* (2019.01)
(Continued)

(52) U.S. Cl.
CPC .......... *G06F 16/221* (2019.01); *G06F 16/211* (2019.01); *G06F 16/2379* (2019.01);
(Continued)

(58) Field of Classification Search
CPC .......... G06F 17/30469; G06F 17/3051; G06F 17/30595
See application file for complete search history.

(56) References Cited

U.S. PATENT DOCUMENTS 5,546,576 A    8/1996  Cochrane et al.
5,761,653 A *  6/1998  Schiefer ............ G06F 17/30463
                                              707/713
(Continued)

FOREIGN PATENT DOCUMENTS

CN        102567434      7/2012
KR      1020010059609    7/2001

OTHER PUBLICATIONS

"The Transaction Processing Performance Council", <http://www.tpc.org/> dated on or before Jun. 29, 2013 (1 page).
(Continued)

*Primary Examiner* — Robert W Beausoliel, Jr.
*Assistant Examiner* — Arthur Ganger

(57) ABSTRACT

According to an example, database constraint generation may include receiving data related to a table in a database, analyzing the data to determine a row count for a column of the table, and analyzing the data to determine a number of distinct values for the column of the table. A comparison value may be determined by comparing the row count to the number of distinct values. The database constraint generation may further include determining if the comparison value is within a threshold. If the comparison value is within the threshold, an annotation may be added to the column of the table such that the column is considered unique during a cardinality estimation process involving the table.

16 Claims, 6 Drawing Sheets

(51) Int. Cl.
*G06F 16/28* (2019.01)
*G06F 16/23* (2019.01)
*G06F 17/30* (2006.01)
*G06F 16/2455* (2019.01)

(52) U.S. Cl.
CPC ........ *G06F 16/284* (2019.01); *G06F 17/3051* (2013.01); *G06F 17/30469* (2013.01); *G06F 17/30595* (2013.01); *G06F 16/24565* (2019.01)

(56) References Cited

U.S. PATENT DOCUMENTS

| | | | |
|---|---|---|---|
| 5,995,957 | A | 11/1999 | Beavin et al. |
| 6,212,514 | B1 | 4/2001 | Eberhard |
| 6,662,175 | B1 | 12/2003 | Chazal et al. |
| 7,096,224 | B2 | 8/2006 | Ravi Murphy et al. |
| 7,328,212 | B2 | 2/2008 | Voss et al. |
| 7,720,824 | B2 | 5/2010 | Barsness et al. |
| 8,229,917 | B1 | 7/2012 | Aneas et al. |
| 2003/0014390 | A1 | 1/2003 | Finlay et al. |
| 2004/0243555 | A1* | 12/2004 | Bolsius ............ G06F 17/30471 |
| 2005/0131913 | A1 | 6/2005 | Barsness et al. |
| 2005/0198048 | A1 | 9/2005 | Barsness et al. |
| 2007/0185838 | A1 | 8/2007 | Peh |
| 2008/0077552 | A1 | 3/2008 | Sanborn |
| 2008/0140696 | A1* | 6/2008 | Mathuria .......... G06F 17/30315 |
| 2009/0083277 | A1* | 3/2009 | Barsness .......... G06F 17/30445 |
| 2009/0150421 | A1* | 6/2009 | Rjaibi ............... G06F 17/30469 |
| 2010/0107244 | A1* | 4/2010 | Li ........................ G06F 21/577 726/22 |
| 2010/0114869 | A1 | 5/2010 | Deolalikar et al. |
| 2013/0024430 | A1* | 1/2013 | Gorelik ............ G06F 17/30371 707/690 |
| 2015/0178366 | A1* | 6/2015 | Farahbod .......... G06F 17/30306 707/603 |
| 2016/0092497 | A1* | 3/2016 | Oberhofer ......... G06F 17/30371 707/693 |

OTHER PUBLICATIONS

Henderson, Michael, et al., Exploiting Join Cardinality for Faster Hash Joins, 2009 (6 pages).
Kolackzkowski, Piotr, M.SC., Autonomic Index Selection in Relational Database Management Systems by Evolutionary Transformations of Query Plans, Oct. 22, 2010 (123 pages).
Korean International Proerty Office, The International Search Report and the Written Opinion for PCT/US2013/038842 dated Jan. 21, 2014 (9 pages).
Park, Jeongmin, et al., An Automatic Code Generation for Self-Healing, Jan. 9, 2008 (29 pages).
Swami, Arun et al.,On the estimation of join result sizes, 1994 (14 pages).
Using constraints to improve query optimization, Download Date: Apr. 25, 2013, <http://pic.dhe.ibm.com/infocenter/db2luw/v9r7/index.jsp?topic= 2Fcom.ibm.db2.luw.admin.perf.doc%2Fdoc%2Fc0055081.html > (2 pages).

* cited by examiner

STORE TABLE — 120

| ID | Name | State |
|---|---|---|
| 1 | S1 | MA |
| 2 | S2 | MA |
| 3 | S1 | NH |
| 4 | S4 | NH |
| 5 | S2 | HN |

*FIG. 2*

SALES TABLE — 140

| Store_ID | Product_ID | Price | Date |
|---|---|---|---|
| 1 | 100 | 52 | 2012-12-30 |
| 2 | 105 | 10 | 2012-12-30 |
| 1 | 105 | 11 | 2012-12-31 |
| 1 | 107 | 100 | 2013-01-01 |
| 3 | 111 | 20 | 2013-01-02 |
| 5 | 100 | 50 | 2013-01-02 |
| 4 | 110 | 25 | 2013-01-03 |

*FIG. 3*

SUPPLY ITEM TABLE  180

| Store_Name | # Supply_items | Date |
|---|---|---|
| S1 | 300 | 2012-12-01 |
| S2 | 1000 | 2012-12-01 |
| S1 | 200 | 2012-12-15 |
| S1 | 500 | 2012-12-16 |
| S1 | 400 | 2012-12-16 |
| S2 | 100 | 2012-12-20 |
| S4 | 50 | 2012-12-20 |

*FIG. 4*

INTERMEDIATE SALES BY EACH STORE TABLE 160

| State | Name | ID | Store.id | Price |
|---|---|---|---|---|
| MA | S1 | 1 | 1 | 52 |
| MA | S2 | 2 | 2 | 10 |
| MA | S1 | 1 | 1 | 11 |
| MA | S1 | 1 | 1 | 100 |
| NH | S1 | 3 | 3 | 20 |
| NH | S2 | 5 | 5 | 50 |
| NH | S4 | 4 | 4 | 25 |

*FIG. 5*

INTERMEDIATE SUPPLY_ITEMS AT SAME NAME STORES TABLE 200

| Name | Store_name | # Supply_items |
|---|---|---|
| S1 | S1 | 300 |
| S1 | S1 | 300 |
| S2 | S2 | 1000 |
| S2 | S2 | 1000 |
| S1 | S1 | 200 |
| S1 | S1 | 200 |
| S1 | S1 | 500 |
| S1 | S1 | 500 |
| S1 | S1 | 400 |
| S1 | S1 | 400 |
| S2 | S2 | 100 |
| S2 | S2 | 100 |
| S4 | S4 | 50 |

*FIG. 6*

DATABASE TABLE COLUMN ANNOTATION

BACKGROUND

Databases, such as relational databases, typically include tables that are analyzed for responding to queries. For example, for a relational database, a collection of tables of data items are typically formally described and organized using a relational model. The tables may include column constraints, such as unique keys, primary keys, or foreign keys. For example, a unique key may include one or more data attributes of a data entity in a table. A primary key may uniquely specify a tuple within a table, in that, a primary key uniquely defines the characteristics of each row of the table. A foreign key is a field in a relational table that matches the primary key column of another table.

BRIEF DESCRIPTION OF DRAWINGS

Features of the present disclosure are illustrated by way of example and not limited in the following figure(s), in which like numerals indicate like elements, in which:

FIG. 2 illustrates a store table, according to an example of the present disclosure;

FIG. 3 illustrates a sales table, according to an example of the present disclosure;

FIG. 4 illustrates a supply item table, according to an example of the present disclosure;

FIG. 5 illustrates intermediate results after a join between the store table of FIG. 2 and the sales table of FIG. 3, according to an example of the present disclosure;

FIG. 6 illustrates intermediate results after a join between the store table of FIG. 2 and the supply table of FIG. 4, according to an example of the present disclosure;

DETAILED DESCRIPTION

Figure 1:
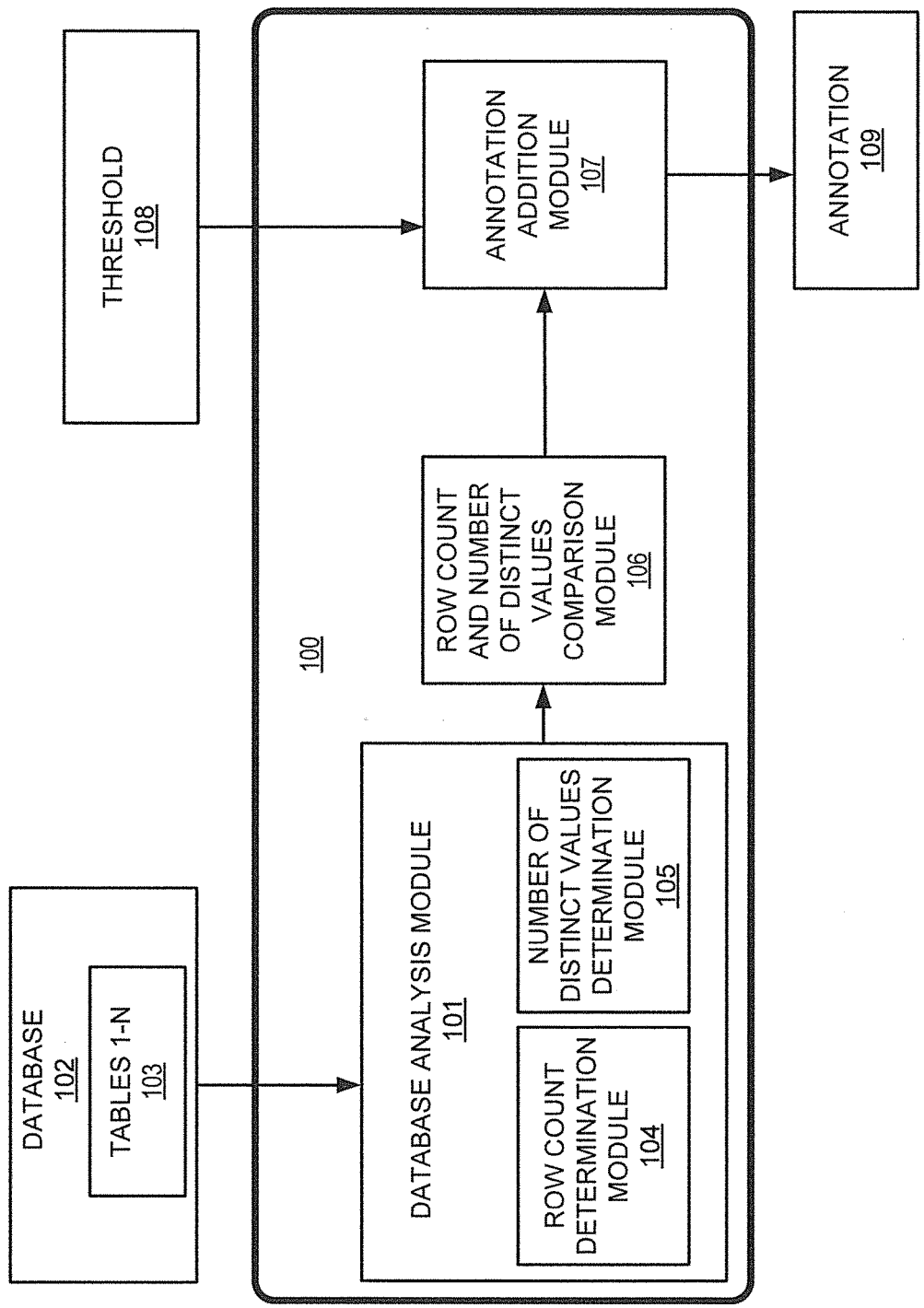
FIG. 1 illustrates an architecture of a database constraint generation apparatus, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

For databases, such as relational databases, that typically include tables that are analyzed for responding to queries, information about table column constraints (e.g., unique keys, primary keys, and foreign keys) is typically needed for optimizing query performance. When such tables are being populated, adding the table column constraints can be burdensome. Accordingly, a table generator (e.g., a user) may either avoid using such table column constraints during database design, or fail to export existing constraints as part of the input data to a database. If such table column constraints are either purposely or inadvertently omitted, it can be challenging and time consuming to determine the precise cause for degradation in query performance, and further remedying the situation by adding the table column constraints.

According to an example, a database constraint generation apparatus and a method for database constraint generation are disclosed herein. The apparatus and method disclosed herein may infer a table annotation, hereinafter termed a "soft-unique constraint". The apparatus and method disclosed herein may further use the inferences to guide query planning in a database, thus significantly improving query performance.

According to an example, the database constraint generation apparatus may include a memory storing machine-readable instructions to receive data related to a table in a database, analyze the data to determine a row count for a column of the table, and analyze the data to determine a number of distinct values for the column of the table. The memory may further store machine-readable instructions to determine a comparison value by comparing the row count to the number of distinct values, and determine if the comparison value is within a threshold. If the comparison value is within the threshold, an annotation may be added to the column of the table to restrict enforcement of a unique property of the column upon data insertions or updates to the column. The database constraint generation apparatus may include a processor to implement the machine-readable instructions.

According to another example, the method for database constraint generation may include receiving data related to a table in a database, analyzing the data to determine a row count for a column of the table, and analyzing the data to determine a number of distinct values for the column of the table. A comparison value may be determined by comparing the row count to the number of distinct values. The method may further include determining if the comparison value is within a threshold. If the comparison value is within the threshold, an annotation may be added to the column of the table such that the column is considered unique during a cardinality estimation process involving the table.

FIG. 1 illustrates an architecture of a database constraint generation apparatus 100, according to an example. Referring to FIG. 1, the apparatus 100 is depicted as including a database analysis module 101 to receive data from a database 102, for example, related to tables 103 (i.e., tables 1-N). A row count determination module 104 may analyze the tables 103 to determine a row count for each of the tables 103. A number of distinct values determination module 105 may analyze the tables 103 to determine a number of distinct values for each column of each of the tables 103. Alternatively, the row count determination module 104 and the number of distinct values determination module 105 may perform the respective analysis on selected columns and/or tables 103 of the database 102. A row count and number of distinct values comparison module 106 may determine if data for a particular column of a table from the tables 103 is unique by comparing the row count and number of distinct values for the particular column. An annotation addition module 107 may receive the comparison data from the row count and number of distinct values comparison module 106 and determine if the received comparison data is within a threshold 108. Thus, the annotation addition module 107 may determine if the row count received from the row count determination module 104 is within a predetermined threshold percentage (i.e., within the threshold 108) of the number of distinct values received from the number of distinct values determination module 105. Further, the threshold 108 may be configured based on user input related to a percentage difference (e.g., 5% difference) between the row count and the number of distinct values. If the received comparison data is within the threshold 108, the annotation addition module 107 may add a table annotation 109, hereinafter termed a soft-unique constraint on appropriate columns (i.e., columns where the row count approximately matches (i.e., is within the threshold 108) the estimated number of distinct values).

The modules 101 and 104-107, and other components of the apparatus 100 that perform various other functions in the apparatus 100, may include machine-readable instructions stored on a non-transitory computer readable medium. In addition, or alternatively, the modules 101 and 104-107, and other components of the apparatus 100 may include hardware or a combination of machine-readable instructions and hardware.

Referring to FIGS. 1-3, FIGS. 2 and 3 respectively illustrate a store table 120 and a sales table 140, according to examples of the present disclosure. In databases, such as the database 102, joins may be used to filter data. For example, referring to the store table 120 and the sales table 140, finding the average sales, by quarter, for all stores in Massachusetts (MA) may involve a join between the store table 120 and the sales table 140, with a filter for Massachusetts stores. For such queries, a foreign-key-primary-key (FK-PK) constraint may be a property that a query optimizer uses to estimate cardinalities (i.e., cardinality of the join results). The cardinalities for the store table 120 and the sales table 140 are respectively five and seven based on the number of rows for these tables. For the store table 120, the primary key is the ID column, which includes IDs 1-5 that are unique. Further, for the sales table 140, the foreign key is the store_ID column, which references the ID column of the store table 120.

A FK-PK join may be designated as a many-to-one (m–1) join, whose cardinality is not higher than the cardinality of the involved FK-defined table, regardless of the size of the involved PK-table. For example, for the store table 120 and the sales table 140, the number of sales records for Massachusetts cannot be higher than the total number of sales records. Without the constraints on join columns, the join may become a many-to-many (m-m) join whose cardinality can be as high as the Cartesian product (i.e., product of rows) of the two involved tables. The cardinality estimates of m–1 joins are generally considered to be more accurate than the cardinality estimates of m-m joins. For a join to be a m–1 join, the tables need to be unique on the join columns (e.g., the store table 120). However, columns of a table do not need to be defined as a primary key, or columns of other tables to be defined as a foreign key.

Referring again to FIGS. 1-3 and 5, FIG. 5 illustrates intermediate results after a join between the store table 120 and the sales table 140, before completing the 'sum (price)' grouped by columns 'name' and 'state', according to an example of the present disclosure. In order to determine the values for the total sales by each store (i.e., table 160) using the store table 120 and the sales table 140, the store table 120 and the sales table 140 may be processed by the following SQL query:
Select state, name, sum (price)
From store, sales
Where store.id=sales.store_id
Group by name, state.

The resulting total sales by each store may include seven rows (i.e., based on the many-to-one (m–1) join). In other words, for the total sales by each store table 160, for the many-to-one join, the cardinality (e.g., seven) is not higher than the cardinality of the involved FK-defined table (e.g., the sales table 140), regardless of the size of the involved PK-table (e.g., the store table 120). Referring to the total sales by each store table 160, the results (i.e., state, name, sum (price)) are as follows:
1) MA, S1, ((52+11+100)=163)
2) MA, S2, 10
3) NH, S1, 20
4) NH, S2, 50
5) NH, S4, 25

Referring again to FIGS. 1-3, 4 and 6, FIGS. 4 and 6 respectively illustrates a supply item table 180, and the intermediate results after a join between the store table 120 and the supply table 180, before completing the sum (# supply_items) grouped by column 'name', according to examples of the present disclosure. The supply item table 180 includes seven rows. Further, for the supply item table 180, the values in the table 180 are based on the assumption that a same name store will receive the same number of supply_items on the same day. In order to determine the values for the total supply_items at same name stores table 200, the store table 120 and the supply item table 180 may be processed by the following SQL query:
Select sum (# supply_items)
From store, supply_item
Where store.name=supply_item.name
Group by name.

The resulting total supply items at same name stores table 200 may include thirteen rows (i.e., based on the many-to-many (m-m) join). However, since this is a many-to-many join, the cardinality of the many-to-many join may be as high as thirty-five (i.e., 5 rows for the store table 120 multiplied by 7 rows for the supply item table 180). The cardinality of the many-to-many join of thirteen for this example is significantly different than the highest possible cardinality of thirty-five. Referring to the total supply items at same name stores table 200, the results are as follows:
1) S1, ((300+300+200+200+500+500+400+400)=2800)
2) S2, ((1000+1000+100+100)=2200)
3) S4, 50

Based on the foregoing examples with reference to FIGS. 2-6, without FK-PK constraints for the store table 120, the sales table 140, and/or the supply item table 180 (that is, when appropriate), a join using these tables may become a m-m join. For example, as discussed above, without the constraints on join columns, the join may become a many-to-many (m-m) join whose cardinality can be as high as the Cartesian product of the two involved tables, and thus delay query processing, for example, by improperly estimating the cardinality of the join.

In order to identify FK-PK constraints, columns of the tables 103 that include unique data may be identified by the database analysis module 101. For example, the database analysis module 101 may analyze statistics on the tables 103 of the database 102. More particularly, the database analysis module 101 may sample data from all columns and construct histograms to capture data distributions. This process may be used to collect the row count and number of distinct values of every column. Based on analysis of statistics, a particular column's data may be determined to be unique if the row count and number of distinct values of the column are equal. Thus, primary key or unique key constraints may be created on such columns. For example, for the foregoing example of the store table 120, the sales table 140, and the supply item table 180, the database analysis module 101 may analyze statistics on these tables. This process may be used to collect the row count and number of distinct values of every column of the store table 120, the sales table 140, and the supply item table 180. After analyzing statistics, a particular column's data (e.g., the ID column of the store table 120) may be determined to be unique if the row count and number of distinct values of the column are equal.

However, if the number of distinct values for a column is computed from a sample of the data, such a computation may include inaccuracies. For example, the sampling process may omit a few duplicate values. Further, even if all the data in the column is unique when analyzing statistics, the data may not remain unique after insertion of additional data into the table. For example, for the foregoing example of the store table 120, assuming that the ID column of the store table 120 includes 100 rows and the number of distinct values for the ID column is computed from a sample of the data (e.g., 50 rows), such a computation may include inaccuracies (e.g., if certain rows of the other 50 rows include duplicate IDs).

In order to address, for example, the foregoing aspects related to omission of a few duplicate values and insertion of additional data, the annotation addition module 107 may add an annotation on a column of a table (e.g., one of the tables 103) by considering the column unique during the cardinality estimating process, and further restricting enforcement of a unique property (e.g., unique key or primary key) upon insertions or updates to the particular column of the table. For example, during the cardinality estimation process for a join result, a column may be considered unique. For example, for the foregoing example of the store table 120, assuming that the ID column of the store table 120 includes 100 rows for which some rows include duplicate IDs, during the cardinality estimating process for a join result, the ID column may be considered unique. Further, for the foregoing example of the store table 120, again assuming that the ID column of the store table 120 includes 100 rows, the unique property (e.g., unique key or primary key) is not enforced upon insertions or updates to the ID column. Instead, the annotation addition module 107 may add an annotation on a column of a table (e.g., the ID column for the store table 120 that may include duplicates).

The annotation addition module 107 may further add annotations on columns where the row count approximately matches (i.e., is within the threshold 108) the estimated number of distinct values. The threshold 108 may be user-configurable or predetermined based on the type of data in the tables 103. For example, a user may configure the threshold 108 at approximately 5% such that the annotation addition module 107 may add annotations on columns where the row count is within approximately 5% of the estimated number of distinct values.

Figure 7:
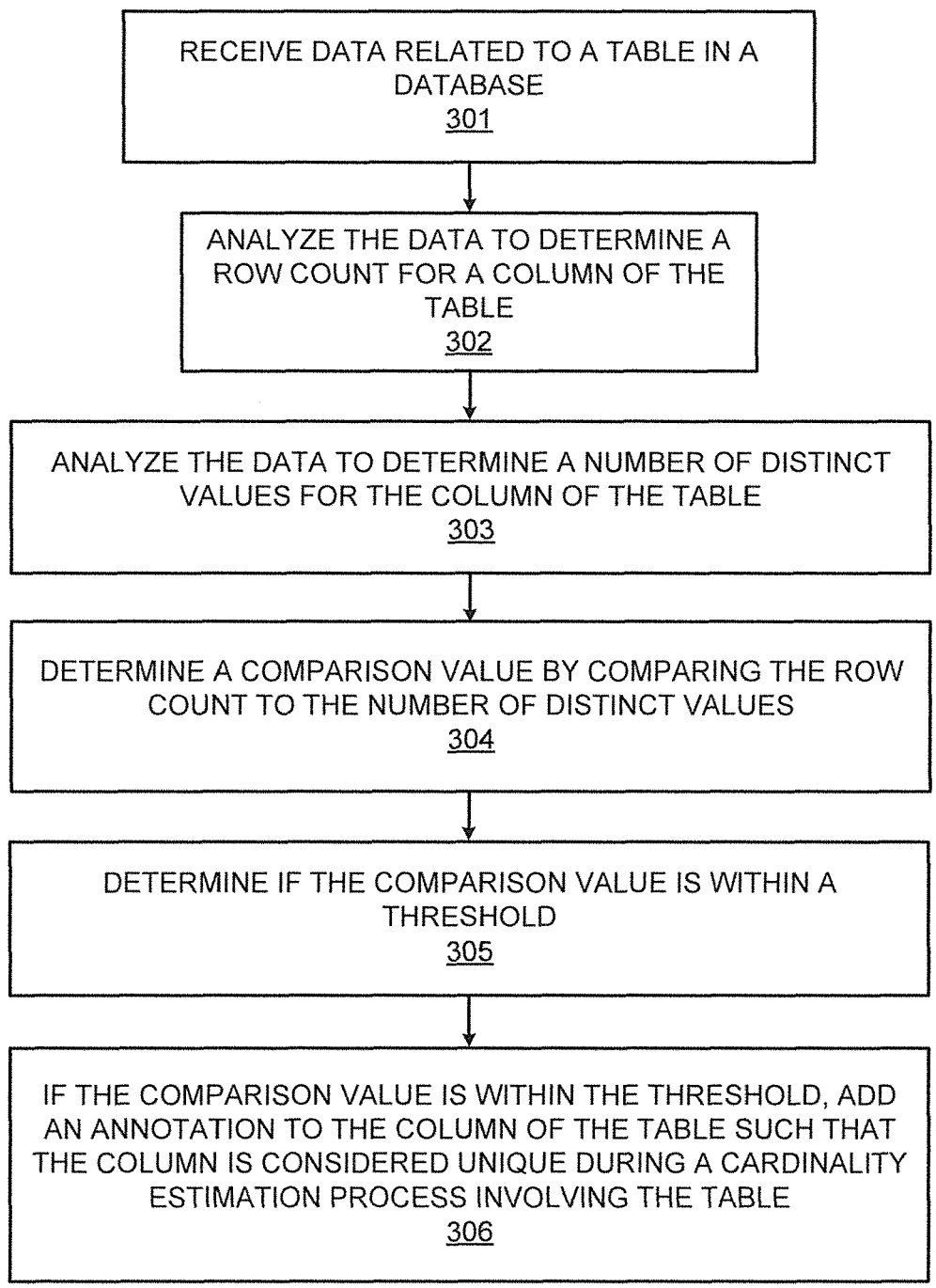
FIG. 7 illustrates a method for database constraint generation, according to an example of the present disclosure.

FIG. 7 illustrates a flowchart of a method 300 for database constraint generation, corresponding to the example of the database constraint generation apparatus 100 whose construction is described in detail above. The method 300 may be implemented on the database constraint generation apparatus 100 with reference to FIG. 1 by way of example and not limitation. The method 300 may be practiced in other apparatus.

Referring to FIG. 7, for the method 300, at block 301, data related to a table in a database may be received. For example, referring to FIG. 1, the database analysis module 101 may receive data from the database 102, for example, related to tables 103 (i.e., tables 1-N).

At block 302, the data may be analyzed to determine a row count for a column of the table. For example, referring to FIG. 1, the row count determination module 104 may analyze the tables 103 to determine a row count for each of the tables 103.

At block 303, the data may be analyzed to determine a number of distinct values for the column of the table. For example, referring to FIG. 1, the number of distinct values determination module 105 may analyze the tables 103 to determine a number of distinct values for each column of each of the tables 103.

At block 304, a comparison value may be determined by comparing the row count to the number of distinct values. For example, referring to FIG. 1, the row count and number of distinct values comparison module 106 may determine if data for a particular column of a table from the tables 103 is unique by comparing the row count and number of distinct values for the particular column. Determining the comparison value by comparing the row count to the number of distinct values may further include determining the comparison value as a percentage value based on a difference between the row count and the number of distinct values.

At block 305, a determination is made if the comparison value is within a threshold. For example, referring to FIG. 1, the annotation addition module 107 may receive the comparison data from the row count and number of distinct values comparison module 106 and determine if the received comparison data is within the threshold 108. The threshold may be greater than approximately 0%, or may be configured based on user input related to a percentage difference between the row count and the number of distinct values.

At block 306, if the comparison value is within the threshold, an annotation may be added to the column of the table such that the column is considered unique during a cardinality estimation process involving the table. For example, referring to FIG. 1, if the received comparison data is within the threshold 108, the annotation addition module 107 may add the annotation 109 (i.e., the soft-unique constraint) on appropriate columns where the row count approximately matches (i.e., is within the threshold 108) the estimated number of distinct values. Adding the annotation to the column of the table may further include restricting enforcement of a unique property of the column upon data insertions or updates to the column. Restricting enforcement of the unique property of the column upon data insertions or updates to the column may further include restricting enforcement of a unique key or a primary key of the column upon data insertions or updates to the column.

Figure 8:
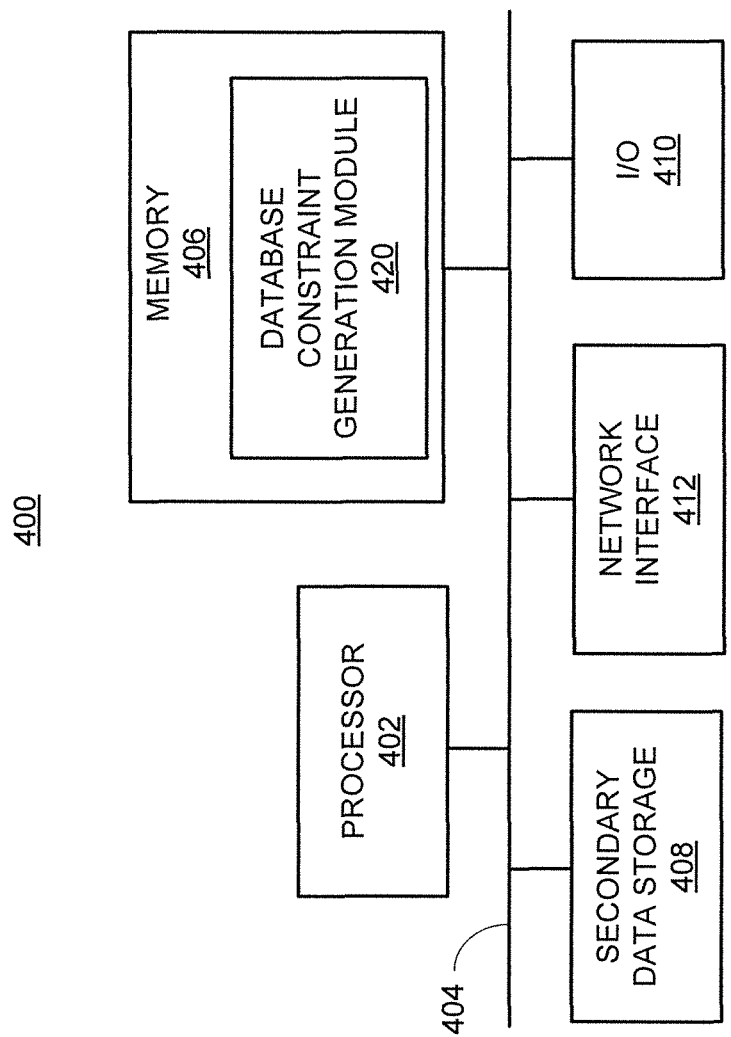
FIG. 8 illustrates a computer system, according to an example of the present disclosure.

FIG. 8 shows a computer system 400 that may be used with the examples described herein. The computer system represents a generic platform that includes components that may be in a server or another computer system. The computer system 400 may be used as a platform for the apparatus 100. The computer system 400 may execute, by a processor or other hardware processing circuit, the methods, functions and other processes described herein. These methods, functions and other processes may be embodied as machine-readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 400 includes a processor 402 that may implement or execute machine-readable instructions performing some or all of the methods, functions and other processes described herein. Commands and data from the processor 402 are communicated over a communication bus 404. The computer system also includes a main memory 406, such as a random access memory (RAM), where the machine-readable instructions and data for the processor 402 may reside during runtime, and a secondary data storage 408, which may be non-volatile and stores machine-readable instructions and data. The memory and data storage are examples of computer readable mediums. The memory 406 may include a database constraint generation module 420 including machine-readable instructions residing in the memory 406 during runtime and executed by the processor 402. The database constraint generation module 420 may include the modules 101 and 104-107 of the apparatus shown in FIG. 1.

The computer system 400 may include an I/O device 410, such as a keyboard, a mouse, a display, etc. The computer system may include a network interface 412 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method for database constraint generation, the method comprising:
    receiving data related to a table in a database;
    analyzing the data to determine a row count for a column of the table;
    analyzing the data to determine a number of distinct values for the column of the table;
    determining a comparison value by comparing the row count to the number of distinct values;
    determining if the comparison value is within a threshold; and
    if the comparison value is within the threshold, adding, by a processor, an annotation to the column specifying a soft-unique constraint for the column,
        wherein the soft-unique constraint indicates the column is considered unique during a cardinality estimation process involving the table, and further indicates to restrict enforcement of a unique property of the column upon data insertions or updates to the column.

2. The method of claim 1, wherein in response to a data insertion or update for the column and upon determining the column is annotated with the soft-unique constraint,
    restricting enforcement of a unique property of the column for the data insertion or the update to the column.

3. The method of claim 2, wherein restricting enforcement of the unique property of the column comprises:
    restricting enforcement of a unique key or a primary key of the column upon the data insertion or the update to the column.

4. The method of claim 1, wherein analyzing the data to determine the number of distinct values for the column of the table further comprises:
    analyzing the data to determine the number of distinct values for each column of the table.

5. The method of claim 1, wherein determining the comparison value by comparing the row count to the number of distinct values further comprises:
    determining the comparison value as a percentage value based on a difference between the row count and the number of distinct values.

6. The method of claim 1, wherein the threshold is greater than approximately 0%.

7. The method of claim 1, further comprising:
    configuring the threshold based on user input related to a percentage difference between the row count and the number of distinct values.

8. A database constraint generation apparatus comprising:
    a memory storing machine-readable instructions to:
        receive data related to a table in a database;
        analyze the data to determine a row count for a column of the table;
        analyze the data to determine a number of distinct values for the column of the table;
        determine a comparison value by comparing the row count to the number of distinct values;
        determine if the comparison value is within a threshold;
        if the comparison value is within the threshold, add an annotation to the column specifying a soft-unique constraint for the column,
            wherein the soft-unique constraint indicates the column is considered unique during a cardinality estimation process involving the table, and further indicates to restrict enforcement of a unique property of the column upon data insertions or updates to the column; and
        in response to a data insertion or update for the column and in response to determining the column is annotated with the soft-unique constraint, restrict enforcement of a unique property of the column for the data insertion or the update to the column; and
    a processor to implement the machine-readable instructions.

9. The database constraint generation apparatus of claim 8, wherein the machine-readable instructions are further to:
    consider the column unique during a cardinality estimation process involving the table responsive to determining the column is annotated with the soft-unique constraint of the column.

10. The database constraint generation apparatus of claim 8, wherein to restrict enforcement of the unique property of the column upon the data insertion or update, the machine-readable instructions are further to:
    restrict enforcement of a unique key or a primary key of the column upon the data insertion or the data update to the column.

11. The database constraint generation apparatus of claim 8, wherein to analyze the data to determine the number of distinct values for the column of the table, the machine-readable instructions are further to:
    analyze the data to determine the number of distinct values for each column of the table.

12. The database constraint generation apparatus of claim 8, wherein to determine the comparison value by comparing the row count to the number of distinct values, the machine-readable instructions are further to:
    determine the comparison value as a percentage value based on a difference between the row count and the number of distinct values.

13. The database constraint generation apparatus of claim 8, wherein the threshold is greater than approximately 0%.

14. The database constraint generation apparatus of claim 8, the machine-readable instructions are further to:

configure the threshold based on user input related to a percentage difference between the row count and the number of distinct values.

15. A non-transitory computer readable medium having stored thereon machine-readable instructions to provide database constraint generation, the machine-readable instructions, when executed, cause a computer system to:
   receive data related to a table in a database;
   analyze the data to determine a row count for a column of the table;
   analyze the data to determine a number of distinct values for the column of the table;
   determine a comparison value by comparing the row count to the number of distinct values;
   determine if the comparison value is within a threshold; and
   if the comparison value is within the threshold, add, by a processor, an annotation to the column of the table to:
      restrict enforcement of a unique property of the column upon data insertions or updates to the column, and
      consider the column unique during a cardinality estimation process involving the table.

16. The non-transitory computer readable medium of claim 15, wherein the machine-readable instructions, when executed, cause a computer system to:
   in response to a data insertion or update for the column and in response to determining the column is annotated with the soft-unique constraint, restrict enforcement of a unique property of the column for the data insertion or the update to the column; and
   consider the column unique during a cardinality estimation process involving the table responsive to determining the column is annotated with the soft-unique constraint of the column.

* * * * *